US010025732B2

United States Patent
Kulick et al.

(10) Patent No.: US 10,025,732 B2
(45) Date of Patent: Jul. 17, 2018

(54) PRESERVING DETERMINISTIC EARLY VALID ACROSS A CLOCK DOMAIN CROSSING

(71) Applicant: Intel Corporation, Santa Clara, CA (US)

(72) Inventors: Stanley Steve Kulick, Portland, OR (US); Bezan Kapadia, Portland, OR (US); James Shehadi, Portland, OR (US); Amir Ali Radjai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 88 days.

(21) Appl. No.: 15/283,396

(22) Filed: Oct. 1, 2016

(65) Prior Publication Data

US 2018/0095910 A1 Apr. 5, 2018

(51) Int. Cl.
*G06F 13/36* (2006.01)
*G06F 13/16* (2006.01)
*G06F 13/40* (2006.01)

(52) U.S. Cl.
CPC ...... *G06F 13/1689* (2013.01); *G06F 13/1673* (2013.01); *G06F 13/4068* (2013.01)

(58) Field of Classification Search
CPC ..................................................... G06F 21/57
See application file for complete search history.

(56) References Cited

U.S. PATENT DOCUMENTS

| 2013/0205160 | A1 | 8/2013 | Turner et al. |
| 2015/0161315 | A1 | 6/2015 | Meil |
| 2016/0092357 | A1 | 3/2016 | Rehana et al. |
| 2016/0259879 | A1 | 9/2016 | Ganai et al. |

OTHER PUBLICATIONS

Verma et al., Understanding Clock Domain Crossing Issues, EE Times-India, Dec. 2007, pp. 1-7.

*Primary Examiner* — Henry Tsai
*Assistant Examiner* — Juanito Borromeo
(74) *Attorney, Agent, or Firm* — Compass IP Law PC

(57) ABSTRACT

A clock domain crossing can occur earlier in time by detection of when a data signal will coincide with a TSV (time slot valid) signal but the valid signal associated with the data signal will not coincide with a TSV. In response to such a detection, the domain crossing circuit can send the valid signal early, resulting in a valid signal sent on an earlier TSV and the data signal sent on a TSV. In one embodiment, such a system can cause a data signal to be received in a slower clock domain on a first edge of the slower clock signal after the data is queued in the faster clock domain. The sending of the early valid indication can reduce latency in transferring data between clock domains.

20 Claims, 9 Drawing Sheets

PRESERVING DETERMINISTIC EARLY VALID ACROSS A CLOCK DOMAIN CROSSING

FIELD

The descriptions are generally related to inter device communication, and more particular descriptions are related to an early valid signal across clock domains.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2016, Intel Corporation, All Rights Reserved.

BACKGROUND

Computing devices include many different components which exchange data to perform the operations of the computing device. For example, a memory subsystem typically exchanges data with a central processor, a graphics processor, or others or a combination. A central processor may exchange data with a memory subsystem, a graphics system, multiple peripherals, or others or a combination. Many of the different components operate on different clock speeds, which can means that different devices use different clocks for I/O (input/output) that interconnects to another component. Clock domain crossing refers to the transfer of data from I/O operated with one clock (one clock domain) to I/O operated with a different clock (another clock domain). The misalignment of clock edges can result in setup and hold time violations without proper transfer management. On the other hand, managing the data transfer for setup and hold times can result in latency, especially when transferring from the faster domain to the slower domain as the faster domain may need to wait to transfer on a clock edge that will enable the slower domain to receive the data.

One traditional approach to clock domain transfer is the use of early warning signals associated with the data to transfer. The early warning signal or "valid signal" or valid indicator (referring to a signal that indicates when valid data should be expected at the receiving device) is sent one or more clock cycles prior to the data to allow the receiver to be ready for the data. The management in clock domain crossing can thus include calculation of when to send early warning signals to indicate data. Such calculations are traditionally done based on a ratio of the two clock speeds or a relative offset between the domains.

Traditional approaches to clock domain crossing management do not scale well to high frequency designs. With long clock periods, delays due to clock domain crossings (which may be referred to simply as clock crossings) can significantly affect latency. Such clock crossing issues have been observed when crossing from high speed processors to memory devices. Longer memory latencies have a significant impact on overall system throughput performance as well as power consumption.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a clock domain crossing can occur earlier in time by detection of the alignment of a TSV (time slot valid) signal with a data signal and its associated valid indicator or valid signal. More specifically, with detection of when a data signal will coincide with a TSV signal but the valid indicator associated with the data signal will not coincide with a TSV, the clock domain crossing circuit can provide the valid indicator on an earlier TSV. Sending the valid indicator early can preserve deterministic early warning across a clock domain crossing. In one embodiment, such a system can cause a data signal to be received in a slower clock domain on a first edge of the slower clock signal after the data is queued in the faster clock domain. The sending of the early valid indication can reduce latency in transferring data between clock domains.

Basing early warning signals or valid indicators only on relative clock domain offsets as traditionally done can result in latency when data aligns with a TSV but the valid indicator does not. If the valid indicator does not align with a TSV, the clock domain crossing (which be referred to simply as "clock crossing") circuit would delay sending the valid indicator. Delaying sending the valid indicator would then necessarily cause delaying the data to maintain a minimum early warning period. In contrast to the traditional approach, the clock crossing circuit can detect when the data signal will align with a TSV but its associated valid indicator will not, and then send the valid indicator early to allow transfer of the data at the earliest opportunity. The system described herein can comply with setup and hold time requirements while also reducing latency in the clock crossing.

Figure 1A:
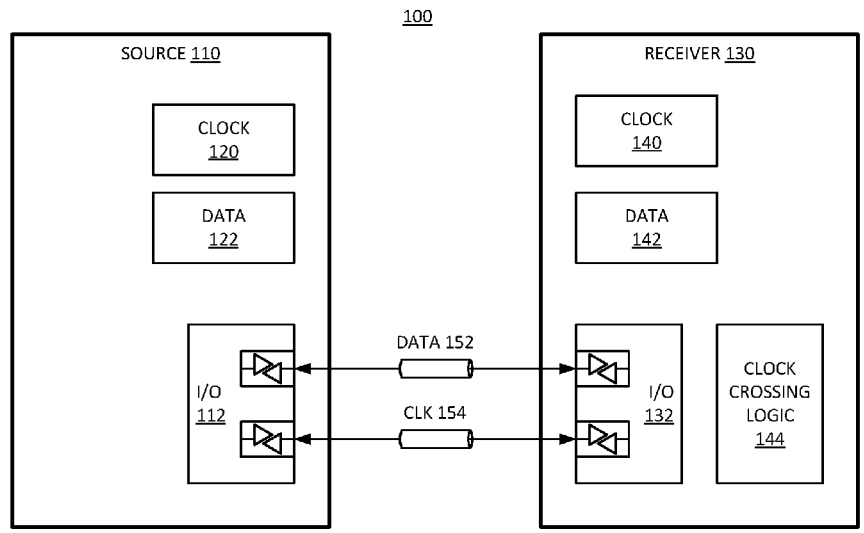
FIG. 1A is a block diagram of an embodiment of a system in which a faster clock domain can send a valid signal indication earlier to a slower clock domain.

FIG. 1A is a block diagram of an embodiment of a system in which a faster clock domain can send a valid signal indication earlier to a slower clock domain. System 100 includes source 110 and receiver 130, which are coupled together to exchange data. Source 110 includes I/O (input/output) 112 and receiver 130 includes I/O 132. I/O 112 and I/O 132 represent I/O hardware or I/O interface logic to couple the devices together and enable the devices to exchange (i.e., send or receiver or both) signals with each other. In one embodiment, source 110 represents the data source, and receiver 130 represents a clock domain crossing circuit that handles clock crossing to forward the data to a target of the data, referring to another logic device or circuit that stores, uses, or otherwise processes the data for use in system 100. The ultimate target is the device that operates in accordance with a slower clock, and the clock domain crossing circuit can prepare the data for exchange with that device. In system 100, I/O 112 is operated in accordance with clock 120, while I/O 132 is operated in accordance with clock 140. Clock 120 operates at a different frequency than clock 140, which results in different clock domains in system 100. In one embodiment, clock 120 has a higher speed or frequency than clock 140, and thus clock 120 is part of a "faster" clock domain relative to the "slower" clock domain of clock 140.

I/O interface logic can include pins, pads, connectors, signal lines, traces, or wires, or other hardware to connect the devices, or a combination of these, and transfer signals representing data in accordance with their respective clocks. As illustrated, I/O 112 and I/O 132 include at least drivers/transceivers for signal lines. Commonly, wires within an integrated circuit interface couple with a pad, pin, or connector to interface signal lines or traces or other wires between devices. I/O interface logic can include drivers, receivers, transceivers, or termination, or other circuitry or combinations of circuitry to exchange signals on the signal lines between the devices. The exchange of signals includes at least one of transmit or receive. The clock rates can control signal eye width, sampling times, slew rate (how quickly data signals transition between asserted and deasserted or between high to low and low to high), and other aspects of data transfer.

For illustration purposes only, and not by way of limitation, system 100 illustrates one or more data signal lines 152 and one or more clock signal lines 154. Data signal lines 152 can represent a data bus or other signal lines or a combination to transfer data from source 110 to receiver 130. Clock signal lines 154 represent clock or strobe signal lines that can control the transfer of data between the devices. Data 122 represents data as provided in accordance with clock 120, and data 142 represents data as provided in accordance with clock 140. It will be understood that the logic patterns of data 122 and data 142 can match exactly, meaning the same patterns of bits are asserted and deasserted. However, transfer of the data with different clocks can result in a transfer of the same data patterns with different timing, such as transition times and hold times.

In one embodiment, system 100 includes clock crossing logic 144 to manage the clock crossing from the faster domain of clock 120 to the slower domain of clock 140. Clock crossing logic 144 is illustrated in system 100 "within" receiver 130, which is a non-limiting example. Clock crossing logic 144 can be implemented in source 110, receiver 130, or as a discrete circuit. Clock crossing logic 144 provides logic that enables the crossing of data from a faster clock domain of source 110 to a slower clock domain of receiver 130, while preserving early valid indication. In one embodiment, clock crossing logic 144 includes TSV logic that generates timeslot valid (TSV) signals, which can be referred to as TSVs. A TSV is a computed indication of when a clock cycle or unit interval of the fast clock domain can safely transfer data to the slow clock domain in a way that the transfer will satisfy the setup and hold time requirements of the receiving slow clock domain. The TSV will be asserted for some cycles, and not be asserted for other cycles, and will typically repeat in a sequence pattern. The deasserted TSV slots prevent the faster clock domain from transferring more data than can be received at the slower clock domain. Thus, the faster clock domain can place data in a data buffer on clock cycles corresponding to TSVs, and the slower clock domain can dequeue the data from the buffer. The TSVs can ensure that the faster clock domain should not overrun the slower clock domain. TSV generation occurs within the faster clock domain. Thus, illustration of clock crossing logic 144 within receiver 130 will still be understood to indicate that the faster clock operates a queuing portion of the clock crossing logic, and that the slower clock operates the dequeuing of the data based on TSV signals and valid indications generated in the faster domain portion of the clock crossing logic.

Those of skill in the art will appreciate that the implementation of clock crossing logic 144 is different for different contexts, but generally includes a buffer such as a first in, first out (FIFO) buffer to receive the data transferred from source 110 to receiver 130. It will be understood that with clock 120 faster than clock 140, source 110 can fill the data buffer faster than receiver 130 can empty it or pop the entries out of the buffer. TSVs can limit how often source 110 places data into the buffer, which can provide backpressure to keep source 110 from overrunning the buffer with data. In one embodiment, clock crossing logic 144 also applies valid indications (which can be referred to as valid signals, or simply as "valids") associated with a data signal, or a valid indication with a data bit/byte in the buffer. The valid indication can be buffered similar to the data, in accordance with the TSVs. By sending valid indications prior to data, clock crossing logic 144 can include early indication or early warning of data at device 130, which can indicate when data will be in the buffer for dequeuing. While there are various different implementations and terminologies for TSV circuits, the use of a FIFO buffer controlled by TSVs can be referred to as a bubble generator. The valid indications may be considered or be comparable to a credit-based system, where transmit and receive credits enable the system to maintain equilibrium between the faster domain and the slower domain.

As described herein, in one embodiment, clock crossing logic 144 applies TSVs and valid indications, with an early TSV detection mechanism for sending valid indications. With the scheduling and buffering of data, system 100 can know ahead of time when data sent from source 110 will arrive at receiver 130. By sending data on a schedule of TSVs, such a determinism of when data transfers can occur is further enforced. By knowing when data can be transferred, and knowing when valid indications for the data will be scheduled to be sent, the system can determine if the valid indication also aligns or coincides with a TSV. If the valid indication for data aligned with a TSV does not align with a TSV, the system can keep the data transfer scheduled, and move the valid indication earlier to align with a TSV. For a system where a valid indication is configured to be sent N clock cycles ahead of the data, the valid indication can be sent N+1 or other N+M (where M is an integer greater than zero) clock cycles early. Thus, the valid indication is sent at least N clock cycles early, which can reduce latency for the clock crossing. Thus, early warning indication can be deterministically transferred across a clock crossing, with reduced latency relative to traditional approaches.

In one embodiment, source 110 and receiver 130 are integrated together on a system on a chip (SOC). As such, system 100 includes a substrate (not specifically shown) to which each source 110 and device 120 are mounted or on which they are integrated. In one embodiment, source 110 and receiver 130 represent discrete components. In one embodiment, source 110 and receiver 130 can represent components dies that are integrated together on an SOC. The devices can be coupled to each other via the substrate. As used herein, coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

Clock domain crossing can occur in many different contexts. For example, a processor typically includes a faster clock relative to other components or subsystems, can coupled to other processors, memory, or peripherals or a combination. Any of these configurations can result in a clock crossings. In one embodiment, source 110 represents a processor device or processor die and receiver 130 represents a memory device or memory die (which can be or include in package memory, in one example). A processor can be or include a single processing unit, a multicore processing unit, or a combination. The processing unit can be a primary processor such as a CPU (central processing unit), a peripheral processor such as a GPU (graphics processing unit), or a combination. In an embodiment where source 110 is a processor and receiver 130 is a memory, system 100 will include a memory controller to control access to the memory. In one embodiment, the memory controller is integrated onto a processor die. In one embodiment, the TSV logic is included on the processor die, such as between a processor core and the memory controller that will control access with the memory devices.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM). A memory subsystem as described herein may be compatible with a number of memory technologies, such as DDR3 (double data rate version 3, original release by JEDEC (Joint Electronic Device Engineering Council) on Jun. 27, 2007, currently on release 21), DDR4 (DDR version 4, initial specification published in September 2012 by JEDEC), DDR4E (DDR version 4, extended, currently in discussion by JEDEC), LPDDR3 (low power DDR version 3, JESD2099-3B, August 2013 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), or others or combinations of memory technologies, and technologies based on derivatives or extensions of such specifications.

In addition to, or alternatively to, volatile memory, in one embodiment, reference to memory devices can refer to a nonvolatile memory device whose state is determinate even if power is interrupted to the device. In one embodiment, the nonvolatile memory device is a block addressable memory device, such as NAND or NOR technologies. Thus, a memory device can also include a future generation nonvolatile devices, such as a three dimensional crosspoint (3DXP) memory device, other byte addressable nonvolatile memory devices, or memory devices that use chalcogenide phase change material (e.g., chalcogenide glass). In one embodiment, the memory device can be or include multi-threshold level NAND flash memory, NOR flash memory, single or multi-level phase change memory (PCM) or phase change memory with a switch (PCMS), a resistive memory, nanowire memory, ferroelectric transistor random access memory (FeTRAM), magnetoresistive random access memory (MRAM) memory that incorporates memristor technology, or spin transfer torque (STT)-MRAM, or a combination of any of the above, or other memory.

Descriptions herein referring to a "RAM" or "RAM device" can apply to any memory device that allows random access, whether volatile or nonvolatile. Descriptions referring to a "DRAM" or a "DRAM device" can refer to a volatile random access memory device. The memory device or DRAM can refer to the die itself, to a packaged memory product that includes one or more dies, or both. In one embodiment, a system with volatile memory that needs to be refreshed can also include nonvolatile memory.

Figure 1B:
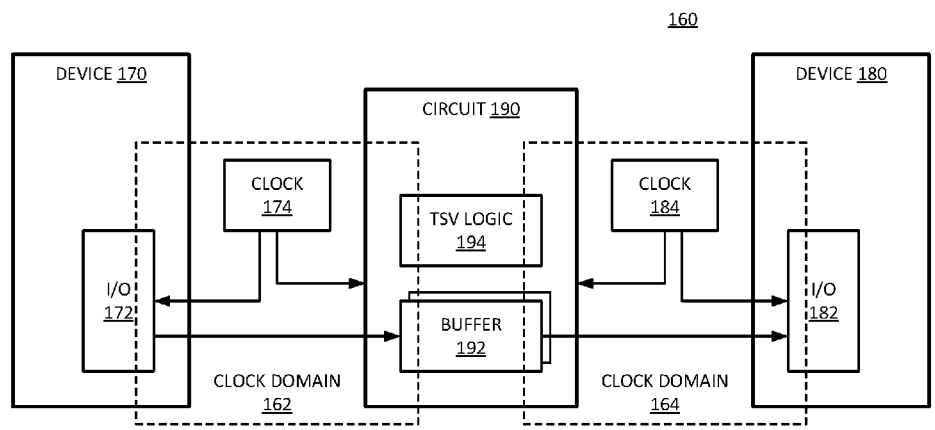
FIG. 1B is a block diagram of an embodiment of a system in which a faster clock domain can send a valid signal indication earlier to a slower clock domain, with a separate domain crossing circuit.

FIG. 1B is a block diagram of an embodiment of a system in which a faster clock domain can send a valid signal indication earlier to a slower clock domain, with a separate domain crossing circuit. System 160 can be one example of a system in accordance with system 100 of FIG. 1A. Device 170 is coupled to device 180 to transfer data. System 160 specifically illustrates circuit 190, which provide clock domain crossing control. Circuit 190 can be or include control logic to control the clock crossing. Circuit 190 includes one or more buffers 192 and TSV logic 194. Buffers 192 include a data buffer to transfer data from device 170 to device 180.

Device 170 includes I/O 172, which is controlled by clock 174. Clock 174 provides fast clock domain 162. Device 170 is the source of the data transfer with respect to data transfer from a faster to a slower clock domain. Device 180 includes I/O 182, which is controlled by clock 184. Clock 184 provides slow clock domain 164. Device 180 is the recipient of the data in the faster to slower clock domain crossing. In one embodiment, either device 170 or device 180 or both can have other associated clock domains, and other I/O circuitry to couple to other devices. In one embodiment, clock 174 is part of device 170. In one embodiment, clock 174 is external to device 170 (or is external to a circuit or die that implements device 170) and is used to drive I/O 172. In one embodiment, clock 184 is part of device 180. In one embodiment, clock 184 is external to device 180 (or is external to a circuit or die that implements device 180) and is used to drive I/O 182.

System 160 illustrates circuit 190 as having a portion within clock domain 162 and another portion within clock domain 164. A data buffer 192 receives data in accordance with fast clock domain 162, which data is then retrieved in accordance with slow clock domain 164. TSV logic 194 supports the transition from fast clock domain 162 to slow clock domain 164, even if the TSV circuits typically operate within the faster clock domain.

In one embodiment, circuit 190 includes one or more other buffers 192. For example, circuit 190 can include a valid indication buffer to transfer valid indications to slow clock domain 164 to indicate to device 180 when to read data from the data buffer. TSV logic 194 includes logic to identify a condition when a valid indication for a transferred item of data will not coincide with a TSV, and the transferred item of data will coincide with a TSV. In response to identifying such a condition, TSV logic 194 transfers the valid indication early to ensure that the valid indication is received in clock domain 164 prior to the associated data, without having to delay the transfer of the data to ensure the valid indication arrives sufficiently early. Not needing to delay the transfer of the data can reduce the clock crossing latency.

In one embodiment, circuit 190 is integrated into device 170. In one embodiment, circuit 190 is integrated into device 180. In one embodiment, circuit 190 is separate from either device 170 or device 180 or both. Circuit 190 enables system 160 to buffer valid indications that indicate what clock edges of clock 184 device 180 should use to remove data from the data buffer.

In one embodiment, device 170 represents a processor core, and device 180 represents a memory controller circuit, which will interface with a memory device. The memory device could potentially be considered device 180, with the memory controller considered to be not illustrated, but to be included in the slower domain. It will be understood that system 160 does not necessarily illustrate all components of a final implementation. For example, a final system will include a memory controller between the processor core and the memory device. In one embodiment, circuit 190 is disposed between the processor core or a processor chip fabric (e.g., an interconnect matrix for components of the processor device) and the memory controller. Thus, the processor core can operate its I/O in the faster clock domain, and the clock crossing logic transfers to the slower clock domain for the memory controller and associated memory devices. It will be understood that examples regarding processors and memory devices and memory controllers are non-limiting examples, and any two logic blocks having different clock domains can apply circuit 190 to transfer between the logic blocks while reducing latency in the clock crossing.

Figure 2:
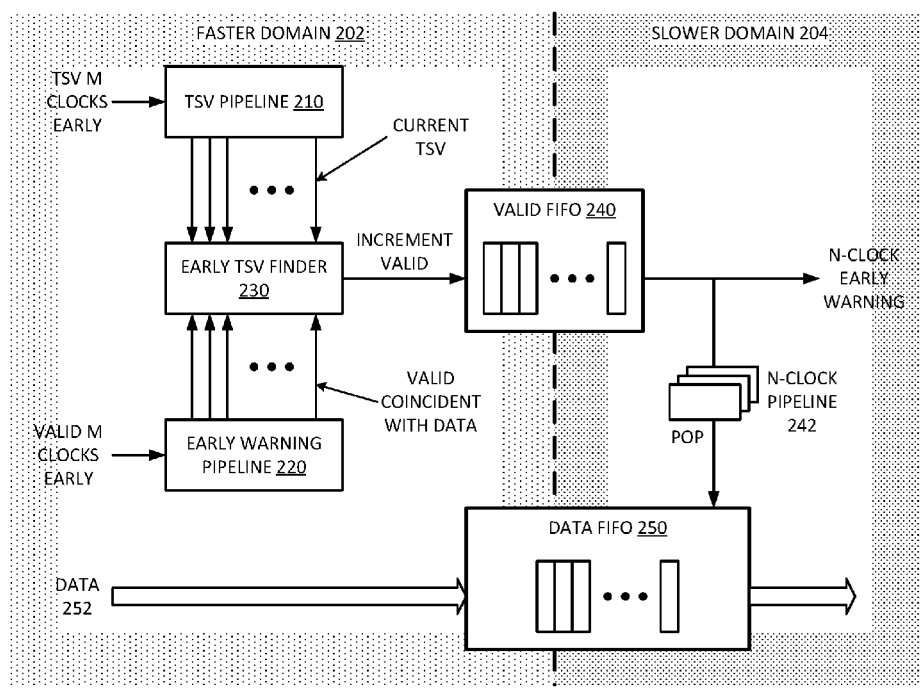
FIG. 2 is a block diagram of an embodiment of a clock domain crossing with a faster clock domain that can determine an earlier TSV for a valid signal that would not coincide with a TSV when its associated data would coincide with a TSV.

FIG. 2 is a block diagram of an embodiment of a clock domain crossing with a faster clock domain that can determine an earlier TSV for a valid signal that would not coincide with a TSV when its associated data would coincide with a TSV. System 200 illustrates an embodiment of TSV logic in accordance with clock crossing logic 144 of FIG. 1A, or TSV logic 194 of FIG. 1B, or both. System 200 includes faster domain 202, operated in accordance with a clock for the data source that is comparatively faster than a clock for the recipient. System 200 includes slower domain 204, operated in accordance with a clock for the recipient that is comparatively slower than the clock for the source. It will be understood that "faster" and "slower" are comparisons between the two domains, and do not necessarily imply any specific clock speed, or any particular ratio between the clocks. Additionally, system 200 does not necessarily suggest any particular number of clock cycles at which an early valid indication should be sent. Such a number of clock cycles can be preconfigured, or configured for a specific system implementation in initialization.

In general for system 200, the TSV logic produces an early valid signal or valid indication that precedes data deterministically by N clocks, which the receiver can use to prepare a data path for minimum latency. It will be understood that the phasing at a clock crossing is generally different when the early warning crosses than the phasing when the data crosses (or is transferred from one device to another), and thus, the delay between valid and data through the clock crossing can vary. In one embodiment, system 200 enables construction of a fixed latency between early warning valid indications and data on the side of slower domain 204 by reading the data N clocks after the valid indication crosses over to the slower side. In system 200, in one embodiment, the circuitry can send a valid indication a fixed number of fast clocks earlier than data to match the worst case phasing delta between valid indication and data. The worst case phasing delta will be dependent on the system configuration, including the phase offset between the two clocks. However, relying on the worst case phasing delays data in the cases where a phasing better than the worst case exists. In one embodiment, system 200 ensures a deterministic early warning with minimum data delay across a clock crossing.

In one embodiment, system 200 assumes a synchronous clock crossing. System 200 is not limited to the implementation of a synchronous crossing. A synchronous clock crossing from a fast frequency to a slower frequency can apply TSV logic to indicate when each data transferred has satisfied timing requirements on the slow side given the worst case timing skew between faster domain 202 and slower domain 204. In one embodiment, faster domain 202 includes a TSV generator (not explicitly shown), which produces a sequence of TSV signals that create TSV pipeline 210.

For each slow clock, one fast clock is identified that provides the minimum delay that satisfies timing. The TSVs represent a sequence indications of fast timeslots on which it is safe to expose data to the slower side. It will be understood that timeslots are triggered on clock edges, and thus a timeslot can be understood as a clock cycle. In general, data could arrive on fast clock edges that are too close to a subsequent slow clock edge, which would violate timing requirements for the data transfer. The sequence of TSVs can include asserted TSVs that indicate when it is safe for data to cross domains, and deasserted TSVs that indicate that it is not safe to cross data over. Thus, for a deasserted TSV, a corresponding valid indication is not exposed to slower domain 204 until another asserted TSV occurs. As a shorthand, general reference to a TSV can be understood to mean an asserted TSV signal.

System 200 illustrates TSV logic that produces an N clock early warning signal (e.g., valid indication N clocks prior to the data) in slower domain 204 for any given fast to slow ratios. In one embodiment, faster domain 202 provides an M clock early warning to generate the N clock early warning in slower domain 204. M represents the maximum number of clocks in the fast domain to achieve an N clock early warning in the slow domain. The value of M can be expressed as M=roundup(N*F/S), where F is the fast frequency, S is the slow frequency, and N is the number of clocks prior to data that the warning should occur in slower domain 204.

In one embodiment, faster domain 202 includes early warning pipeline 220 to produce valid bits from M to 0 clocks earlier than data. Zero clocks earlier is coincident with the data. Pipeline 220 provides a pipeline of valid indications for M clocks earlier than the data. In one embodiment, faster domain 202 includes a TSV generator (not explicitly shown) to generate TSV signals to identify the fast clocks in which writes may be safely exposed to the slower domain 204. In one embodiment, TSV pipeline 210 matches early warning pipeline 220, producing all possible TSVs in which a valid indication should be incremented when empty. Thus, TSV pipeline 210 illustrates TSV M clocks early as input. The TSV zero clocks early is the current TSV. Early TSV finder 230 identifies an earlier TSV when a valid indication does not coincide with a TSV. In one embodiment, early TSV finder 230 finds the oldest valid bit in early warning pipeline 220 that is at least N TSVs prior to data arrival. Early TSV finder 230 can transfer the identified valid bit to a valid counter of valid FIFO 240. Transferring an identified valid bit causes a valid bit to be transferred to slower clock domain 204 N clocks earlier than data is safe.

In one embodiment, system 200 tracks the valid bit clock crossings with a counter, incremented with a write in the faster domain 202 and decremented in each TSV or a read in slower domain 204. In an implementation with such a counter, valid FIFO 240 can transfer the value of the counter to the slower domain 204, with a delay that allows for clock skew. In one embodiment, slower domain 204 asserts a valid indication for any slow clock for which the counter is not zero. Faster domain 202 provides data 252 to data FIFO 250, and in one embodiment, slower domain 204 reads data from the clock crossing data FIFO 250 a fixed number (N) clocks after the valid indication. The valid input (the input to valid FIFO 240) indicates data transfer. The valid output (the output from valid FIFO 240) provides the N clock early warning in slower domain 204. In one embodiment, slower domain 204 includes N clock pipeline 242 to pop data off the data FIFO, or dequeue data from data FIFO 250.

As another perspective on system 200, with early TSV finder 230, system 200 can calculate when to increment a valid indication in faster domain 202 to enable slower domain 204 to read the data as soon as clock skew allows. Reading as soon as clock skew allows can be one or more clock cycles faster than a traditional approach, which would delay the reading of the data until the sending of a valid indication on a later TSV, instead of finding an earlier TSV signal to send the valid indication. The range of the interval between the early warning and the data depends on the frequency ratios supported.

Figure 3:
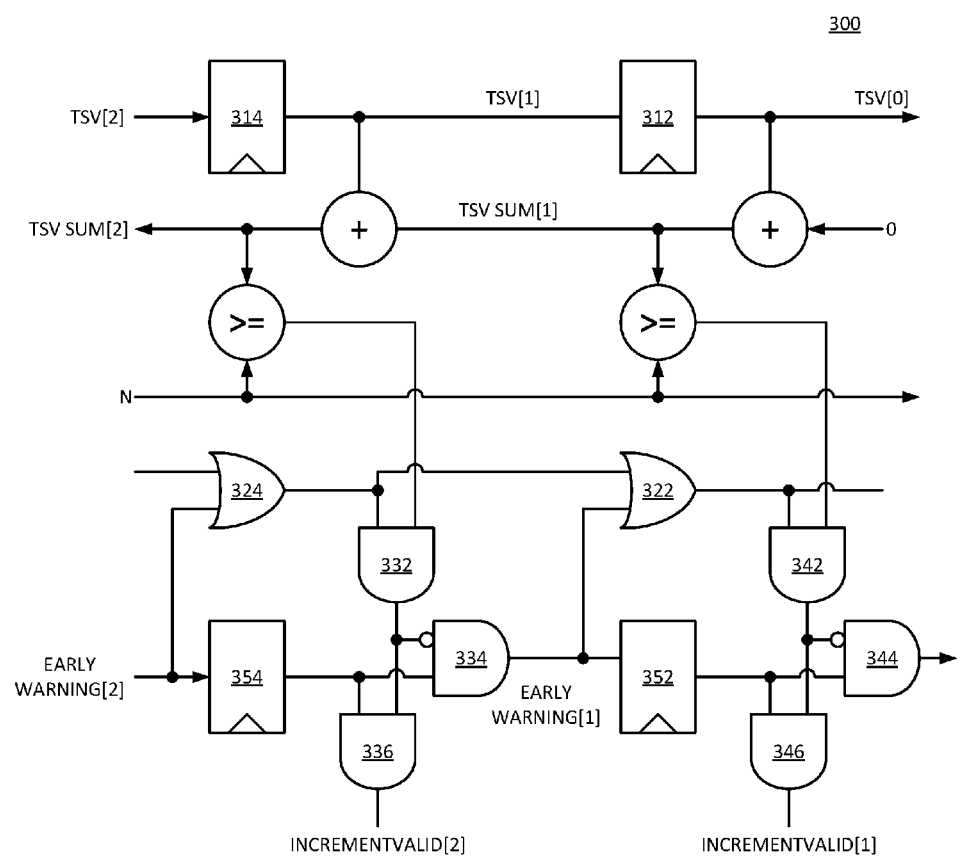
FIG. 3 is an embodiment of a circuit representation of stages of an early TSV finder.

FIG. 3 is an embodiment of a circuit representation of stages of an early TSV finder. Circuit 300 includes two stages of an "early TSV finder" logic, such as early TSV finder 230 of FIG. 2. It will be understood that early TSV finder 230 can be implemented in different ways than what is shown in circuit 300, but circuit 300 provides one example circuit that can operate in accordance with early TSV finder 230.

In accordance with circuit 300, the circuit from left to right shows newer to older signals. Thus, TSV[0] is the oldest signal in the pipeline and is the current TSV. TSV[1] was buffered in the pipeline after TSV[0], and before TSV[2], and so forth. Other components of circuit 300 will be understood in a similar fashion.

In one embodiment, the first stage of circuit 300 (with latches 312 and 352, and the logic components coupled to them) increments a valid indication one fast clock before data is safe to expose to the slow side. In one embodiment, the second stage of circuit 300 (with latches 314 and 354 and logic components coupled to them) increments the valid indication two fast clocks before data is safe to expose to the slow side. Thus, a continuation of circuit 300 to more stages would increment the valid indication signal one more fast clock cycle with each additional stage.

In one embodiment, latches 312 and 314 latch the TSVs as they progress through the pipeline of circuit 300. A series of adders can count the number of TSVs before data can be exposed. Thus, the value of 0 is input to the first stage adder, and TSV Sum[1] is input to the adder in the second stage. Further TSV sums would be provided to later stages, if applicable. In one embodiment, oldest stage (meaning the stage closest to TSV[0]) which has a count greater than or equal to N activates its IncrementValid signal. In one embodiment, when a stage asserts IncrementValid, the valid bit is cleared before moving to the next stage. If any stage asserts IncrementValid, the valid counter is incremented.

Looking at the second stage of circuit 300, the logic components apply several conditions to asserting the IncrementValid signal. The IncrementValid[2] signal for the second stage is asserted when the output of AND gate 336 is a high or one or True. Gate 336 outputs a one when the output of latch 354 is high and the output of AND gate 332 is high. AND gate 334 provides a logic high signal for the first stage if the output of gate 332 is NOT high and if the output of latch 354 is high. Latch 354 is high if Early Warning[2] from a subsequent stage is high. XOR gate 324 also receives Early Warning[2], and outputs a logic high if either Early Warning [2] is high or a subsequent early warning signal is high, but not both. The output of XOR gate 324 is input into AND gate 332. AND gate 332 also receive an input from a logic comparison component that outputs a one if TSV Sum[2] is greater than or equal to (>=) N. Thus, if either Early Warning[2] or a subsequent early warning signal is high but not both, and if TSV Sum[2] is greater than or equal to (>=) N, AND gate 332 outputs a one. If Early Warning[2] is high and AND gate 332 outputs a high, AND gate 336 asserts IncrementValid[2]. If Early Warning[2] is high and the output of AND gate 332 is low, AND gate 336 does not assert IncrementValid[2], but AND gate 334 asserts Early Warning[1] for the first stage.

The first stage has the same logic with similar reference numerals, where XOR gate 322 detects the state of Early Warning[2] and a previous early warning output, as well as Early Warning[1]. Latch 352 holds Early Warning[1]. AND gates 342, 344, and 346 provide similar function to AND gates 332, 334, and 336 of the second stage, and can control whether to assert IncrementValid[1].

Figure 4:
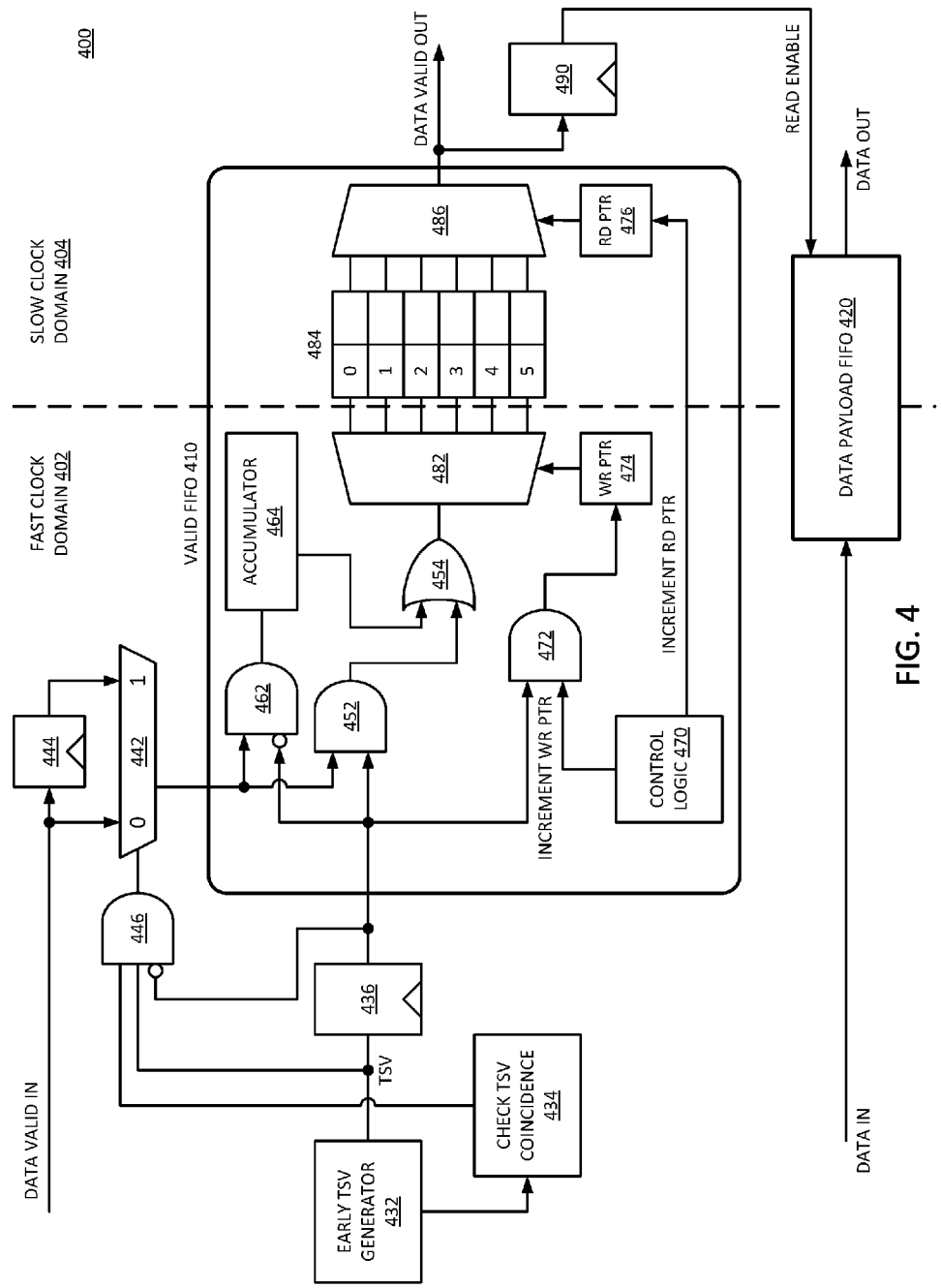
FIG. 4 is a block diagram of an embodiment of a clock domain crossing with an early TSV finder to reduce data transfer delay from the faster clock domain to the slower clock domain.

FIG. 4 is a block diagram of an embodiment of a clock domain crossing with an early TSV finder to reduce data transfer delay from the faster clock domain to the slower clock domain. System 400 provides one example of an embodiment of TSV logic in accordance with an embodiment of system 200 of FIG. 2. System 400 can therefore be an example of TSV logic for clock crossing logic 144 of FIG. 1A, or TSV logic 194 of FIG. 1B, or both. System 400 provides one example of an implementation of TSV logic where N=1, or where an early valid indication is provided 1 clock cycle ahead of the data. In accordance with system 200, it will be understood that other values of N can be used. In accordance with system 400, a valid indication can be provided up to 2 clock cycles before the data while crossing from fast clock domain 402 to slow clock domain 404. The expressions "fast" and "slow" will be understood to be relative rather than absolute, and refer to speeds as compared to each other. Thus, one of the domains has a clock frequency that is higher or a clock that is faster than the other.

In one embodiment, system 400 provides an example of a synchronous clock crossing. It will be understood that any synchronous clock crossing logic has frequency limitations. Thus, a particular implementation can be simplified accordingly. In one embodiment, system 400 provides an implementation that handles cases where: 1) Valid indications cannot appear back to back; 2) The fast clock frequency is no more than twice the slow frequency; and, 3) The delay between the valid indication and when the data can be safely dequeued varies by no more than one fast clock cycle. In one embodiment, system 400 has a valid indication counter than can be incremented in any fast clock if it is nonzero. Circuit 300 provides a more general example.

System 400 provides a dynamic early warning valid indication, because of statically producing valid indications based on TSVs, system 400 can dynamically adjust the generation of a valid indication to an earlier TSV to reduce clock crossing delay. System 400 includes valid FIFO 410 to buffer valid indications from fast clock domain 402 to slow clock domain 404. Slow clock domain 404 can use the valid indications from valid FIFO 410 to know what clock cycles to dequeue data from data payload FIFO 420. Fast clock domain 402 places DATA IN in data payload FIFO 420, and slow clock domain 404 reads out the data. In one embodiment, system 400 is configured for slow clock domain 404 to read data out of data payload FIFO 420 one slow clock after the valid indication is crossed over from fast clock domain 402 to slow clock domain 404.

In one embodiment, valid FIFO 410 receives at least one TSV input and at least one DATA VALID IN input to determine whether to buffer a valid indication or increment a valid indication counter. For the TSV input, in one embodiment, system 400 includes early TSV generator 432 to generate TSVs. In one embodiment, system 400 includes a single stage pipeline 436 to pipeline the TSV prior to inputting it to valid FIFO 410.

TSV generator 432 generates the TSV signals in accordance with a pattern based on the clocks of the two domains. For example, consider data and valid indication crossing from a 400 MHz clock to a 266.67 MHz clock. The corresponding ratio here for the two clocks is 3:2 (i.e., dividing both by a common divisor of 133.33 MHz). In accordance with a 3:2 ratio of fast domain to slow domain, TSV generator 432 can generate TSVs on two out of three clocks on the side of fast clock domain 402 to safely expose any valid indication or data from the fast side to slow clock domain 404 in a deterministic manner. The deterministic clock crossing can account for clock skew and other timing requirements to transfer data from fast clock domain 402 to slow clock domain 404. An example of the output from TSV generator 432 is: 110 110 110 . . . , where a 1 is an asserted TSV signal, and a 0 is a deasserted TSV signal.

For the DATA VALID IN input, in one embodiment, system 400 includes multiplexer (mux) 442 to select among DATA VALID IN signals of a pipeline. As with the TSV, in system 400 the pipeline is only a single signal in latch 444. In a system with a deeper pipeline, mux 444 can include more inputs for the different pipeline stages. Thus, mux 442 will select between the current valid indication signal at input '1' or the earlier valid indication signal of the DATA VALID IN at input '0'. While not specifically shown, logic within system 400 or other logic can generate the DATA VALID IN signal.

In one embodiment, the selection of mux 442 depends on three conditions, which are the three input to AND gate 446. One input to gate 446 is the TSV from TSV generator 432. Another input to gate 446 is a signal indicating coincidence of the TSV with DATA_IN. Logic 434 receives the TSV output from TSV generator 432, and performs a TSV to data coincidence check (logic 434). Logic 434 can be considered to "see ahead in time," by determining if the TSV coincides with the data, and controlling whether the valid indication signal also coincides with the TSV. The third input to AND gate 446 is the inverse of the output of latch pipeline 436, which represents the previous TSV signal being input into valid FIFO 410.

System 400 can dynamically determine when to write the DATA VALID IN signal (which generates the valid indication) into valid FIFO 410 relative to DATA IN. In the example of system 400, the circuitry can dynamically determine to write DATA VALID IN into valid FIFO 410 either 1 clock early or 2 clocks early relative to the DATA IN. In one embodiment, there are three conditions that control whether to write DATA VALID IN two clocks before the DATA IN into valid FIFO 410 as illustrated by the three inputs to AND gate 446. One condition is that there should be no TSV in the clock cycle or clock period if the DATA VALID IN was written into valid FIFO 410 one clock earlier as compared to the DATA IN, which is the NOT input of the output of latch 436. A second condition is that there should be a TSV in the clock cycle if the DATA VALID IN was written into valid FIFO 410 two clocks earlier as compared to the DATA IN, which is the input from early TSV generator 432. A third condition is that DATA IN should be written into data payload FIFO in a clock cycles having a corresponding TSV, which is the input from logic 434. In one embodiment, if all three conditions are met, gate 446 outputs a logic high and selects mux 442 to dynamically pull in the DATA VALID IN by two clocks relative to the DATA IN, which can reduce the latency through the clock crossing. Thus, the circuit of system 400 can see ahead in time to when the system is going to receive a valid indication relative, enabling the sending of the valid indication one or more clocks earlier (or just one clock early in the specific example of system 400).

Valid FIFO 410 ca include input logic to receive the input for valid indication and the input for TSV. In one embodiment, valid FIFO 410 includes AND gate 452 to receive the DATA VALID IN signal from mux 442 and the TSV pipeline signal from pipeline latch 436, and generate an output to XOR gate 454 based on those two inputs. In one embodiment, valid FIFO 410 includes AND gate 462 to receive the DATA VALID IN signal from mux 442 and the inverse of the TSV pipeline signal from pipeline latch 436.

In one embodiment, valid FIFO 410 includes accumulator 464 to introduce to prevent early valid indication. In one embodiment, accumulator 464 only applies when early valid indication cannot be sent, such as in the case that a particular frequency ratio of fast clock domain 402 to slow clock domain 404 reduces the ability to predict early valid indication. In one embodiment, with accumulator 464, if DATA VALID IN appears on the input of valid FIFO 410 on a clock when there is no TSV, then AND gates 452 and 462 cause accumulator 464 to increment, which would drain on the next available TSV in fast clock domain 402. In one embodiment, accumulator 464 is only allowed to drain if there is no DATA VALID IN on the input of valid FIFO 410.

XOR gate 454 can ensure that the valid indication buffer or counter portion 484 of valid FIFO 410 is incremented if either the output of gate 452 is high or the output of accumulator 464 is high, but not both. In one embodiment, XOR gate 454 provides an input signal to demux 482, which can place the value in valid indication buffer 484. For reading out the valid indication signal, mux 486 provides an output that is DATA VALID OUT. The DATA VALID OUT output of mux 486 can also be provided to latch 490 to control the demuxing of data from data payload FIFO 420. It will be understood that while 6 elements or entries of valid indication buffer 484 are illustrated, there could be more or fewer than 6 elements. Thus, valid indication buffer 484 can include any M entries.

In one embodiment, valid FIFO 410 includes control logic 470 to dynamically write the DATA VALID IN into valid FIFO 410. In one embodiment, every clock cycle in fast clock domain 402 where there is an asserted TSV, the system permits writing DATA VALID IN is into valid FIFO 410. Control logic 470 can output a control signal to cause the TSV input to valid FIFO 410 to cause write pointer (WR PTR) 474 to increment, and thus select the next entry of valid indication buffer 484. More specifically, in one embodiment, AND gate 472 combines the control signal from control logic 470 with the TSV input, and if both are high, write pointer 474 is incremented. It will be understood that write pointer 474 should count in accordance with the number of entries in valid indication buffer 484. In one embodiment, control logic 470 can apply the same control logic that causes write pointer 474 to be incremented to also increment read pointer (RD PTR) 476 to select a corresponding entry for the DATA VALID OUT signal. Thus, mux 486 can output the selected entry to latch 490, and select associated data from data payload FIFO 420. It will be understood that read pointer 476 should count in accordance with the number of entries in valid indication buffer 484.

From the perspective of terminology, it will be understood that the general logic of valid FIFO 410 can sometimes be referred to as a bubble generator, and the valid indications can be thought of as transmit and receive "credits," where the system attempts to keep a balance between the fast clock and the slow clock by transferring when credits are available. The different terminologies can refer to circuitry that provide similar functionality to the general functionality of system 400. However, traditional bubble generators and credit systems do not provide a mechanism to send early an early warning indication. System 400 can send and early warning early if it is determined that the data is aligned with a TSV and the valid indication is not.

Figure 5A:
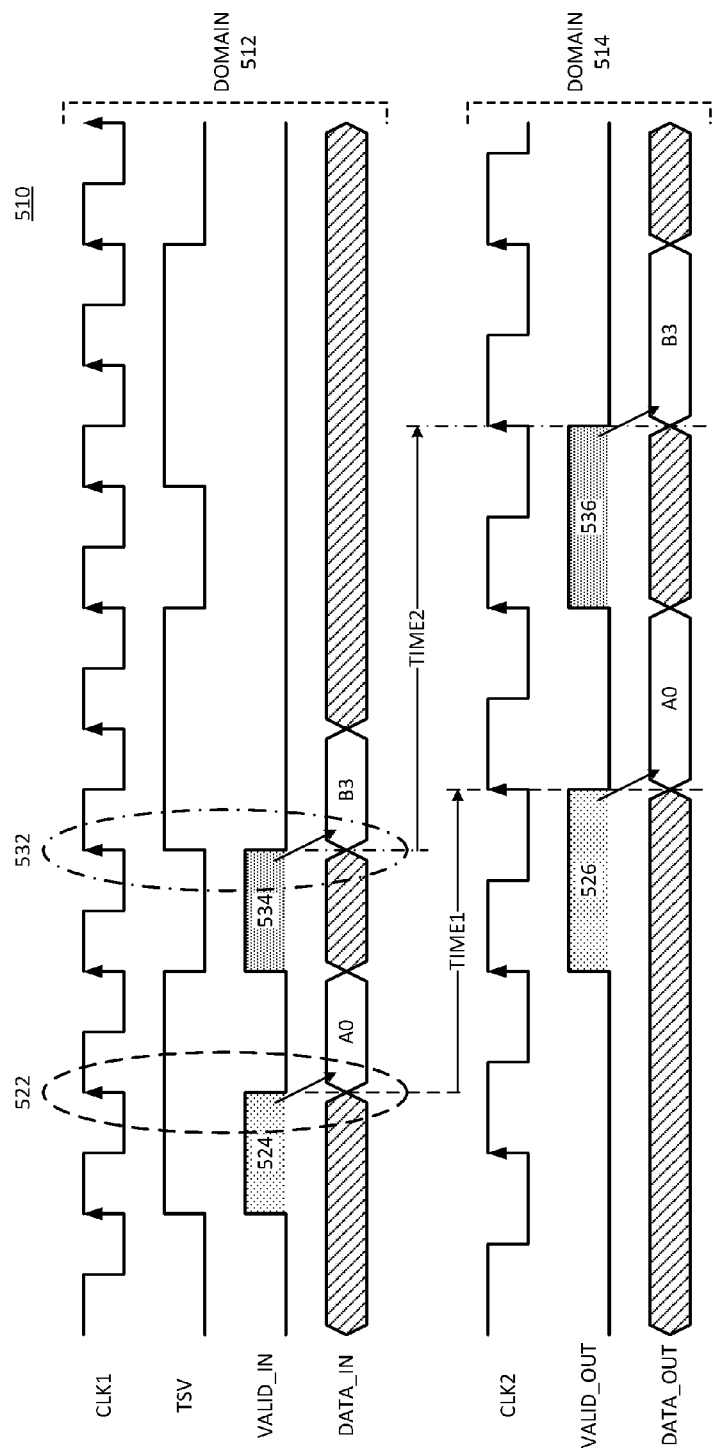
FIG. 5A is a timing diagram of a prior art clock domain crossing.

FIG. 5A is a timing diagram of a prior art clock domain crossing. Diagram 510 provides one example of timing for a clock domain crossing in accordance with prior art traditional systems. Diagram 510 represents faster clock domain 512 and slower clock domain 514. For faster clock domain 512, diagram 510 illustrates signals representing the fast domain clock (CLK1), the TSV signal, VALID_IN signal, and DATA_IN signal. CLK1 is a clock that triggers on the rising edge. TSV signals add in the timing diagram; thus, the assertion of two TSV signals on consecutive clock cycles is represented in diagram 510 as a signal asserted high for two clock cycles. The VALID_IN signal line includes two valid indications asserted: valid indication 524 and valid indication 534. Valid indication 524 corresponds to data 'A0' of DATA_IN, and valid indication 534 corresponds to data 'B3' of DATA_IN.

For slower clock domain 514, CLK2 represents the clock signals for the slow domain. For purposes of illustration, CLK2 and CLK1 are related by a ratio of 3:2, where the time period between high and low transitions is 1.5 times as long in CLK2 as compared to CLK1 due to CLK1 having a frequency 1.5 times as fast as CLK2. VALID_OUT corresponds to VALID_IN of fast clock domain 512. VALID_IN represents the valid indications as provided into the valid indication buffer from fast clock domain 512, and VALID_OUT represents the valid indications as dequeued in slow clock domain 514. It will be observed that VALID_OUT signals have a period longer than the same VALID_IN signals, corresponding to the increased period of the clock. VALID_OUT valid indication signals 526 and 536 correspond in slow clock domain 514 to DATA_OUT 'A0' and 'B3'.

Diagram 510 represents two different cases of clock crossing. The first case is illustrated at portion 522. As illustrated in portion 522, VALID_IN valid indication 524 is one clock CLK1 before DATA_IN A0 and both VALID_IN and DATA_IN are written into the FIFO in clocks when there are TSVs. Observe that the time between the clock edge in portion 522 where data A0 is transferred to the time data A0 is retrieved as DATA_OUT in slow clock domain 514 is TIME1. It will be observed that VALID_IN valid indication 526 occurs one cycle of CLK2 prior to DATA_OUT A0.

The second case is illustrated at portion 532. As illustrated in portion 532, VALID_IN 534 is one clock CLK1 before DATA_IN B3. It will be observed that while DATA_IN B3 coincides with a TSV and is thus written into the FIFO on a TSV, VALID_IN valid indication 534 does not coincide with a TSV. Even though DATA IN B3 is written into the FIFO on TSV and could in theory be read out immediately because timing will be satisfied for the data, in accordance with a traditional approach slow clock domain 514 cannot read the data out immediately. Instead, fast clock domain 512 will wait one clock cycle CLK1 to cross over valid indication 534 when there is a TSV. Thus, slow clock domain 514 will have to wait before reading VALID_OUT valid indication 536, which delays VALID_OUT valid indication 536 by a slow clock cycle CLK2. The delay in the valid indication then delays reading out DATA_OUT B3 by a slow clock cycle CLK2 to have VALID_OUT valid indication 536 arrive one slow clock CLK2 prior to DATA_OUT B3. It will be observed that the time between the clock edge in portion 532 wherein data B3 is transferred or crossed over to the time data B3 is read out as DATA_OUT in slow clock domain 514 is TIME2. It will be observed that TIME2 is significantly longer than TIME1 due to the delay in crossing over valid indication 534 on a subsequent TSV.

Figure 5B:
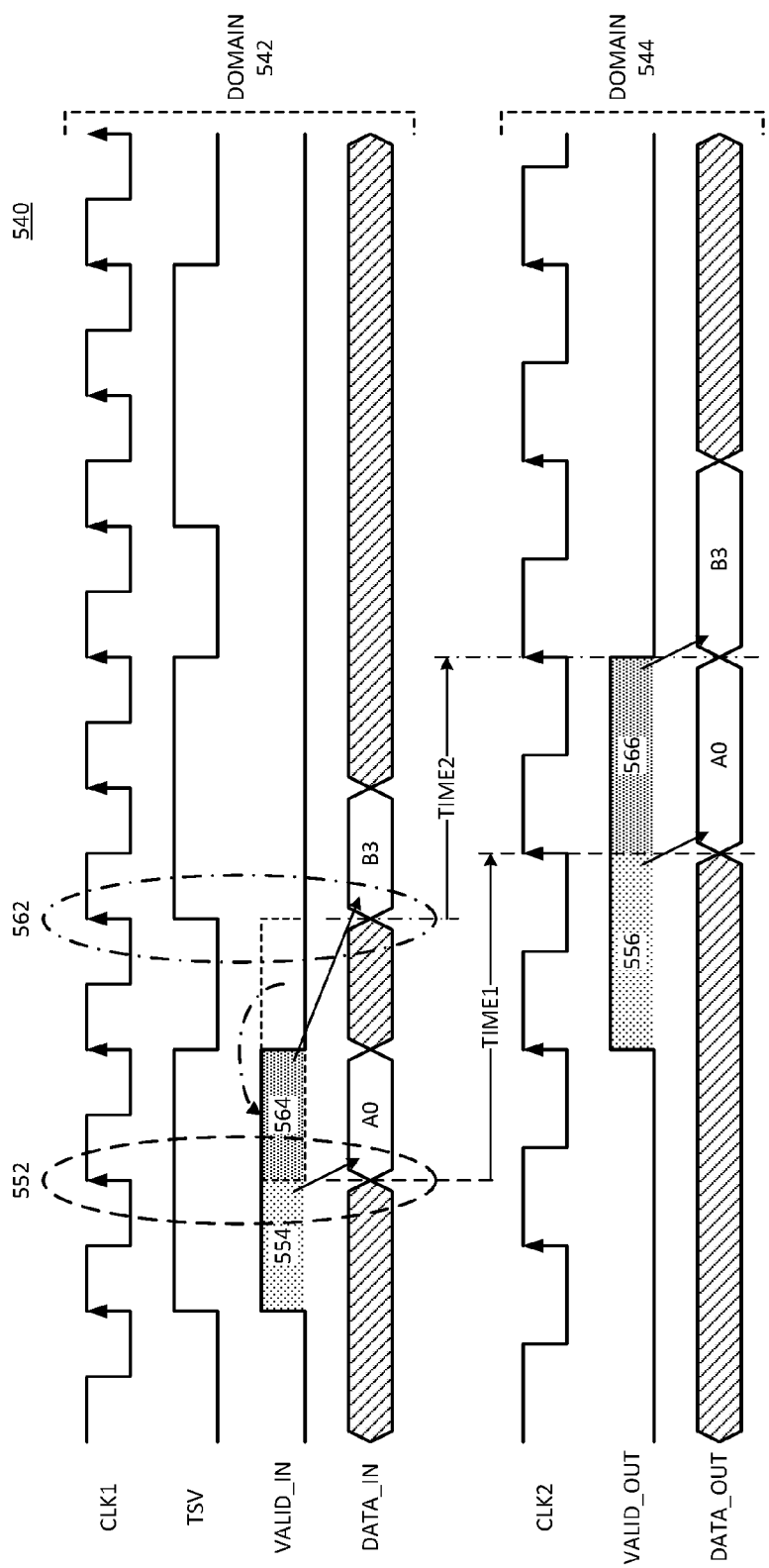
FIG. 5B is a timing diagram of a clock domain crossing with early TSV detection.

FIG. 5B is a timing diagram of a clock domain crossing with early TSV detection. Diagram 540 represents faster clock domain 542 and slower clock domain 544. Diagram 540 can represent a timing diagram for a system in accordance with system 400 of FIG. 4, for example, and is in contrast to diagram 510 of FIG. 5A. Much of diagram 540 is the same or similar to diagram 510, but whereas In diagram 510 valid indication 534 is delayed for a clock cycle before being crossed over, fast domain 542 operates in accordance with what is described herein to send the valid indication a clock cycle CLK1 sooner.

For faster clock domain 542, diagram 540 illustrates signals representing the fast domain clock (CLK1), the TSV signal, VALID_IN signal, and DATA_IN signal. CLK1 is a clock that triggers on the rising edge. As before, the assertion of two TSV signals on consecutive clock cycles is represented in diagram 540 as a signal asserted high for two clock cycles. The VALID_IN signal line includes two valid indications asserted: valid indication 554 in accordance with a normal timing, and valid indication 564 on clock cycle CLK1 early. Valid indication 554 corresponds to data 'A0' of DATA_IN, and valid indication 564 corresponds to data 'B3' of DATA_IN.

For slower clock domain 544, CLK2 represents the clock signals for the slow domain. For purposes of illustration, CLK2 and CLK1 are related by a ratio of 3:2, similar to diagram 510. VALID_OUT corresponds to VALID_IN of fast clock domain 542. VALID_IN represents the valid indications as provided into the valid indication buffer from fast clock domain 542, and VALID_OUT represents the valid indications as dequeued in slow clock domain 544. VALID_OUT valid indication signals 556 and 566 correspond in slow clock domain 544 to DATA_OUT 'A0' and 'B3'.

Diagram 540 represents two different cases of clock crossing. The first case is illustrated at portion 552, and in one embodiment can be identical to the first case at portion 522 of diagram 510. In portion 552, VALID_IN valid indication 554 is one clock CLK1 before DATA_IN A0 and both VALID_IN and DATA_IN are written into the FIFO in clocks when there are TSVs. The time between the clock edge in portion 552 where data A0 is transferred or crossed over to the time data A0 is read out as DATA_OUT in slow clock domain 544 is TIME1, which can be the same as in diagram 510. It will be observed that VALID_IN valid indication 556 occurs one cycle of CLK2 prior to DATA_OUT A0.

The second case is illustrated at portion 562, and varies significantly from the similar case in diagram 510. Whereas the case where the valid indication and data both coincide with TSVs can be the same, the case where data coincides with a TSV and the valid indication does not is handled differently. As illustrated in portion 562, VALID_IN valid indication 564 would normally be one clock CLK1 before DATA_IN B3, as represented by the dashed lines. It will be observed that while DATA_IN B3 coincides with a TSV and is thus written into the FIFO on a TSV, VALID_IN valid indication 564 does not coincide with a TSV one clock CLK1 prior to B3. In one embodiment, the clock crossing circuit identifies the clock cycle prior to the dashed are where valid indication 564 would normally be, and dynamically crosses the valid indication over one clock cycle early, as illustrated by the dashed back arrow. While valid indication 564 is now more than one clock cycle CLK1 prior to DATA_IN B3, valid indication 564 still corresponds to data B3. VALID_IN valid indication 564 now coincides with a TSV and is crossed over.

As seen in domain 544, VALID_OUT valid indication 566 occurs one slow clock cycle CLK2 prior to the comparable case in diagram 510. The early crossing over of valid indication 566 enables the earlier reading out of data B3, which is read out a clock cycle CLK2 earlier in diagram 540 as compared to diagram 510. Instead of writing valid indication 564 one clock cycle early relative to data B3, the system corresponding to diagram 540 writes valid indication 564 two clock cycles CLK1 early relative to data B3, which can enable the data to be read out at the earliest possible time in slow clock domain 544.

It will be observed that in slow clock domain 544 VALID_OUT valid indication 566 still occurs one slow clock cycle CLK2 prior to data B3, but was crossed over one fast cycle earlier than would otherwise be done. Thus, it will be observed that data B3 is read out one slow clock CLK2 earlier as compared to diagram 510, and the time between the crossing over of data B3 from fast clock domain 542 to the time the data is read out in slow clock domain 544 is TIME2. TIME2 is shorter in diagram 540 than the comparable time in diagram 510, which reduces delay associated with the clock crossing.

Figure 6:
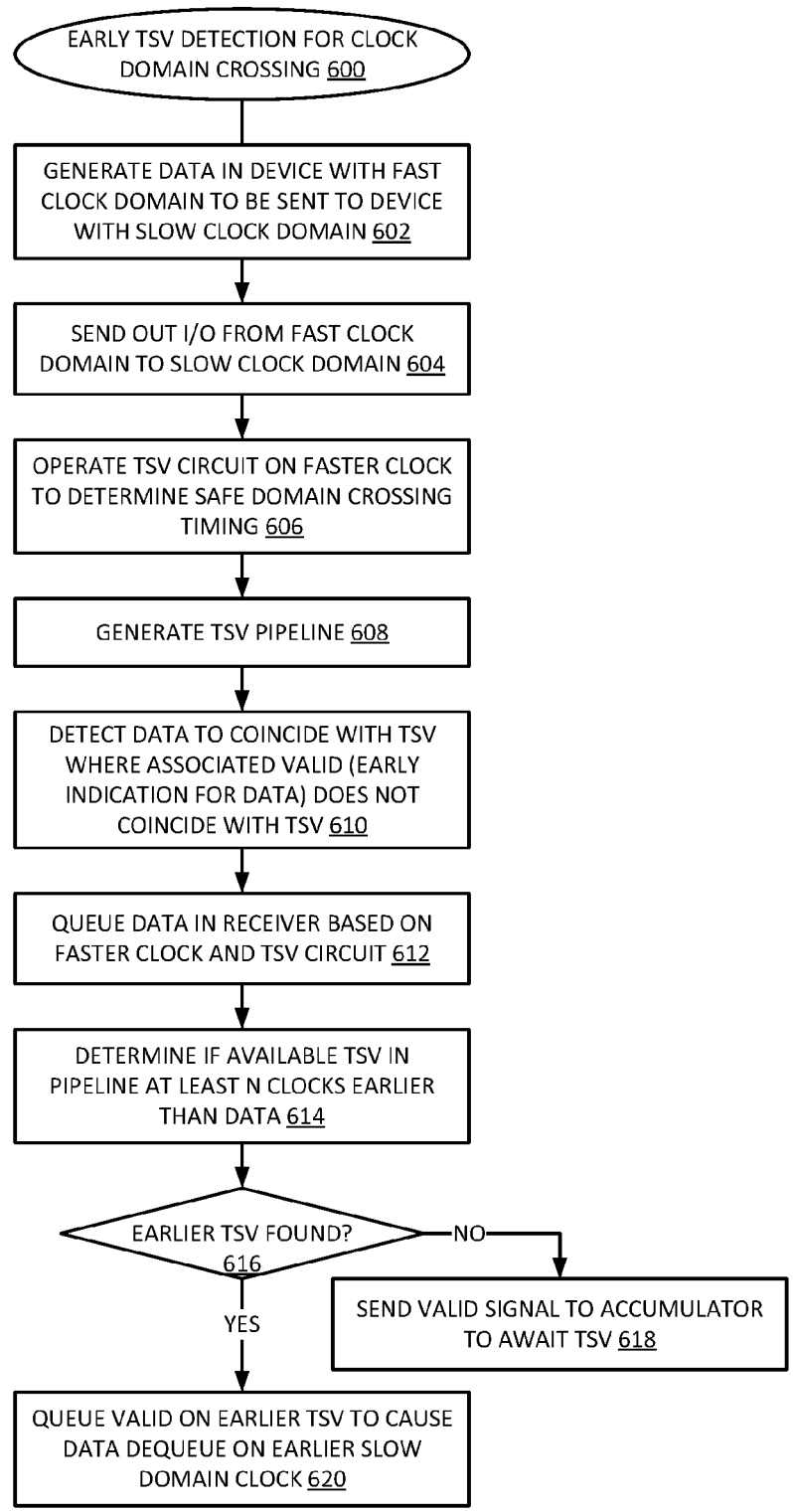
FIG. 6 is a flow diagram of an embodiment of a process for finding an early TSV for a clock domain crossing.

FIG. 6 is a flow diagram of an embodiment of a process for finding an early TSV for a clock domain crossing. Process 600 for early TSV detection for clock domain crossing can be performed in clock crossing logic in accordance with any embodiment described herein where a valid indication is dynamically transferred early to coincide with an asserted TSV signal in the faster clock domain. A device with a faster I/O clock and thus with a faster clock domain generates data to be sent to another device with a slower I/O clock and slower clock domain, 602. The device of the faster clock domain sends out I/O to the slower clock domain, 604. The I/O is sent in accordance with the faster clock and read in accordance with the slower clock.

In one embodiment, the clock domain crossing circuit operates a TSV circuit in accordance with a faster clock to determine safe domain crossing timing, 606. The safe domain crossing timing can be managed by TSVs and valid indication signals, where valid indications signals can be sent prior to data to the slower clock domain to enable the slower domain to setup to read the data out of the data buffer.

In one embodiment, the clock domain crossing circuit generates a TSV pipeline, 608. As described above, the TSV pipeline can be a single stage or multiple stages of TSV signals that are generated in accordance with a repeated pattern based on the ratio of the fast and slow clocks. In one embodiment, the clock domain crossing circuit detects data that coincides with a TSV where the associated valid indication does not coincide with a TSV, 610. In one embodiment, a clock domain crossing circuit queues data in a receive buffer based on the faster clock and based on a TSV signal generated by the clock domain crossing circuit, 612. For example, the circuit may queue the data only on a TSV valid (or logic high) signal. Responsive to detecting a condition where data that coincides with a TSV where the associated valid indication does not coincide with a TSV, the clock domain crossing circuit determines if there is an available TSV in the pipeline that is at least N clocks earlier than the data, 614. Such a determination can search for a TSV signal that is not already associated with a valid indication signal.

In one embodiment, if an earlier TSV is not found, 616 NO branch, the clock domain crossing circuit includes an accumulator or comparable circuit to delay the valid indication until a TSV is available to cross over the valid indication. Thus, the clock domain crossing circuit can send the valid indication signal to the accumulator to await a TSV if an early TSV cannot be found, 618. In one embodiment, the clock domain crossing circuit includes an early TSV detection or early TSV finder circuit that successfully finds an earlier TSV, 616 YES branch. In accordance with finding the earlier TSV, in one embodiment the clock domain crossing circuit can queue the valid indication on the earlier TSV to cross the valid indication over to the slower clock domain, which can cause the dequeuing of the associated data on an earlier slow clock cycle of the slower clock domain, 620.

Figure 7:
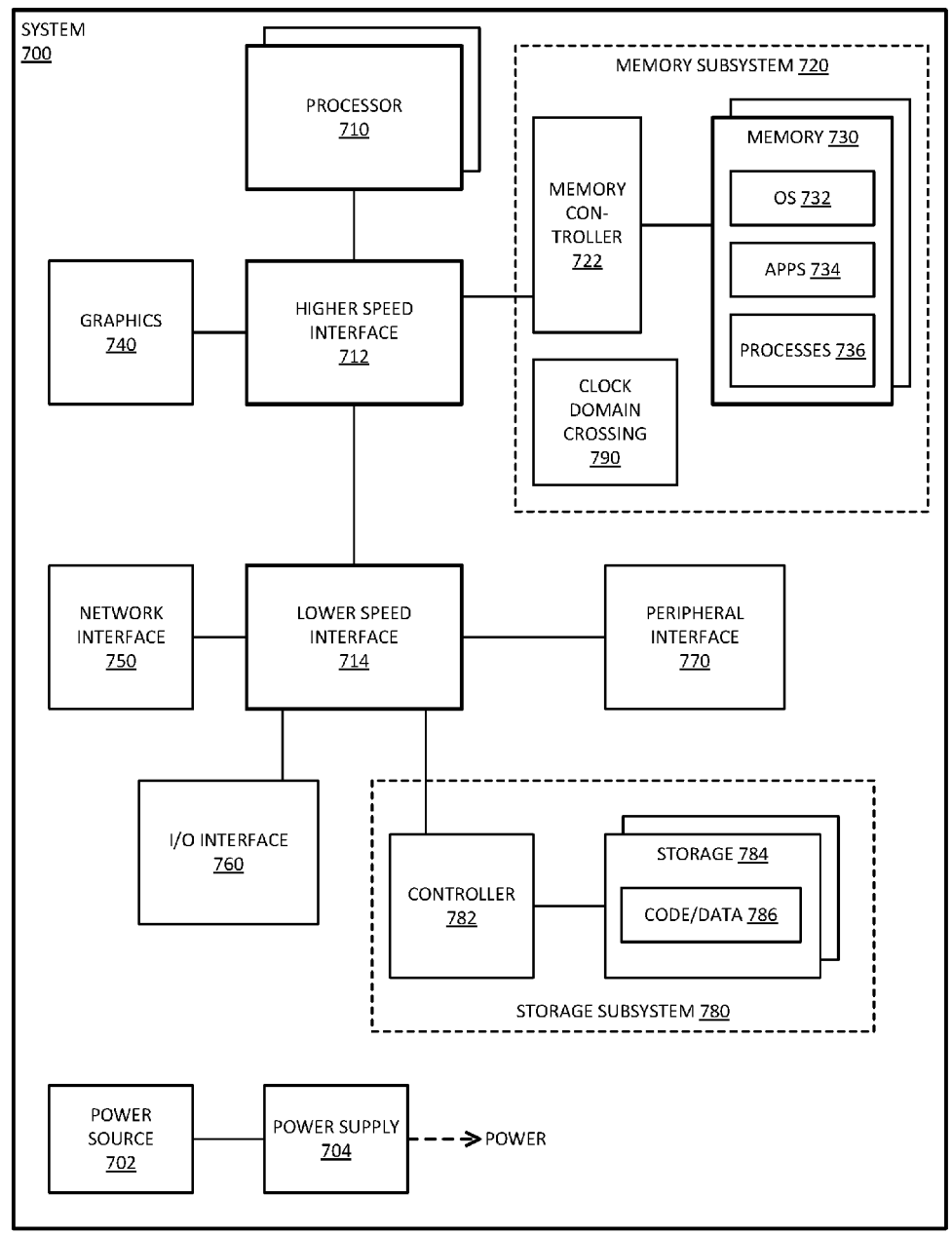
FIG. 7 is a block diagram of an embodiment of a computing system in which early TSV detection for a clock domain crossing can be implemented.

FIG. 7 is a block diagram of an embodiment of a computing system in which early TSV detection for a clock domain crossing can be implemented. System 700 represents a computing device in accordance with any embodiment described herein, and can be a laptop computer, a desktop computer, a tablet computer, a server, a gaming or entertainment control system, a scanner, copier, printer, routing or switching device, embedded computing device, a smartphone, a wearable device, an internet-of-things device or other electronic device.

System 700 includes processor 710, which provides processing, operation management, and execution of instructions for system 700. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one embodiment, system 700 includes interface 712 coupled to processor 710, which can represent a higher speed interface or a high throughput interface for system components that needs higher bandwidth connections, such as memory subsystem 720 or graphics interface components 740. Interface 712 can represent a "north bridge" circuit, which can be a standalone component or integrated onto a processor die. Where present, graphics interface 740 interfaces to graphics components for providing a visual display to a user of system 700. In one embodiment, graphics interface 740 can drive a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others. In one embodiment, the display can include a touchscreen display. In one embodiment, graphics interface 740 generates a display based on data stored in memory 730 or based on operations executed by processor 710 or both.

Memory subsystem 720 represents the main memory of system 700, and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one embodiment, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

In one embodiment, system 700 includes interface 714, which can be coupled to interface 712. Interface 714 can be a lower speed interface than interface 712. In one embodiment, interface 714 can be a "south bridge" circuit, which can include standalone components and integrated circuitry. In one embodiment, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can exchange data with a remote device, which can include sending data stored in memory or receiving data to be stored in memory.

In one embodiment, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one embodiment, system 700 includes storage subsystem 780 to store data in a nonvolatile manner. In one embodiment, in certain system implementations, at least certain components of storage 780 can overlap with components of memory subsystem 720. Storage subsystem 780 includes storage device(s) 784, which can be or include any conventional medium for storing large amounts of data in a nonvolatile manner, such as one or more magnetic, solid state, or optical based disks, or a combination. Storage 784 holds code or instructions and data 786 in a persistent state (i.e., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (i.e., the value or state of the data is indeterminate if power is interrupted to system 700). In one embodiment, storage subsystem 780 includes controller 782 to interface with storage 784. In one embodiment controller 782 is a physical part of interface 714 or processor 710, or can include circuits or logic in both processor 710 and interface 714.

Power source 702 provides power to the components of system 700. More specifically, power source 702 typically interfaces to one or multiple power supplies 704 in system 702 to provide power to the components of system 700. In one embodiment, power supply 704 includes an AC to DC (alternating current to direct current) adapter to plug into a wall outlet. Such AC power can be renewable energy (e.g., solar power) power source 702. In one embodiment, power source 702 includes a DC power source, such as an external AC to DC converter. In one embodiment, power source 702 or power supply 704 includes wireless charging hardware to charge via proximity to a charging field. In one embodiment, power source 702 can include an internal battery or fuel cell source.

In one embodiment, memory subsystem 720 of system 700 includes clock domain crossing 790, which represents logic to perform a clock domain crossing in accordance with any embodiment described herein where a valid indication is dynamically transferred early to coincide with an asserted TSV signal in the faster clock domain. The transfer early in the faster clock domain can reduce a delay in reading out the data associated with the valid indication in the slower clock domain, in accordance with what is described herein. In one embodiment, clock domain crossing logic 790 represents one or more circuits between a processor core circuit of processor 710 and a circuit of memory controller 722. For example, clock domain crossing logic 790 can represent a circuit on a processor die that includes processor cores and integrated memory controller 722. In one embodiment, such an embodiment can further include one or more memory dies of memory 730 integrated with a processor die in an SOC package.

Figure 8:
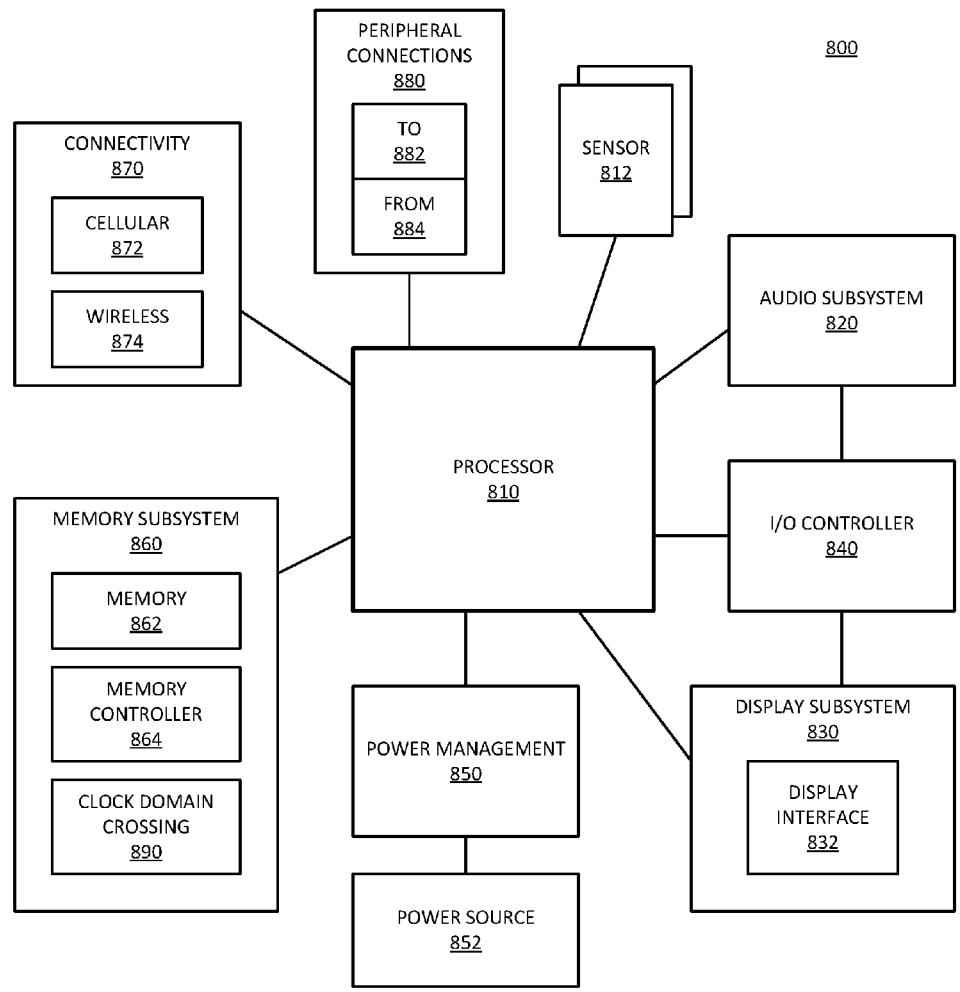
FIG. 8 is a block diagram of an embodiment of a mobile device in which early TSV detection for a clock domain crossing can be implemented.

FIG. 8 is a block diagram of an embodiment of a mobile device in which early TSV detection for a clock domain crossing can be implemented. Device 800 represents a mobile computing device, such as a computing tablet, a mobile phone or smartphone, a wireless-enabled e-reader, wearable computing device, an internet-of-things device, or other mobile device, or an embedded computing device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and device functions are executed. The processing operations include operations related to I/O (input/output) with a human user or with other devices, operations related to power management, operations related to connecting device 800 to another device, or a combination. The processing operations can also include operations related to audio I/O, display I/O, or other interfacing, or a combination. Processor 810 can execute data stored in memory. Processor 810 can write or edit data stored in memory.

In one embodiment, system 800 includes one or more sensors 812. Sensors 812 represent embedded sensors or interfaces to external sensors, or a combination. Sensors 812 enable system 800 to monitor or detect one or more conditions of an environment or a device in which system 800 is implemented. Sensors 812 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 812 can also include sensors for biometric systems such as fingerprint recognition systems, face detection or recognition systems, or other systems that detect or recognize user features. Sensors 812 should be understood broadly, and not limiting on the many different types of sensors that could be implemented with system 800. In one embodiment, one or more sensors 812 couples to processor 810 via a frontend circuit integrated with processor 810. In one embodiment, one or more sensors 812 couples to processor 810 via another component of system 800.

In one embodiment, device 800 includes audio subsystem 820, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software components (e.g., drivers) that provide a visual display for presentation to a user. In one embodiment, the display includes tactile components or touchscreen elements for a user to interact with the computing device. Display subsystem 830 includes display interface 832, which includes the particular screen or hardware device used to provide a display to a user. In one embodiment, display interface 832 includes logic separate from processor 810 (such as a graphics processor) to perform at least some processing related to the display. In one embodiment, display subsystem 830 includes a touchscreen device that provides both output and input to a user. In one embodiment, display subsystem 830 includes a high definition (HD) display that provides an output to a user. High definition can refer to a display having a pixel density of approximately 100 PPI (pixels per inch) or greater, and can include formats such as full HD (e.g., 1080 p), retina displays, 4K (ultra high definition or UHD), or others. In one embodiment, display subsystem includes a touchscreen display. In one embodiment, display subsystem 830 generates display information based on data stored in memory or based on operations executed by processor 810 or both.

I/O controller 840 represents hardware devices and software components related to interaction with a user. I/O controller 840 can operate to manage hardware that is part of audio subsystem 820, or display subsystem 830, or both. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 or display subsystem 830 or both. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800, or sensors 812. The input can be part of direct user interaction, as well as providing environmental input to the system to influence its operations (such as filtering for noise, adjusting displays for brightness detection, applying a flash for a camera, or other features).

In one embodiment, device 800 includes power management 850 that manages battery power usage, charging of the battery, and features related to power saving operation. Power management 850 manages power from power source 852, which provides power to the components of system 800. In one embodiment, power source 852 includes an AC to DC (alternating current to direct current) adapter to plug into a wall outlet. Such AC power can be renewable energy (e.g., solar power, motion based power). In one embodiment, power source 852 includes only DC power, which can be provided by a DC power source, such as an external AC to DC converter. In one embodiment, power source 852 includes wireless charging hardware to charge via proximity to a charging field. In one embodiment, power source 852 can include an internal battery or fuel cell source.

Memory subsystem 860 includes memory device(s) 862 for storing information in device 800. Memory subsystem 860 can include nonvolatile (state does not change if power to the memory device is interrupted) or volatile (state is indeterminate if power to the memory device is interrupted) memory devices, or a combination. Memory 860 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to control access to memory device 862.

Connectivity 870 includes hardware devices (e.g., wireless or wired connectors and communication hardware, or a combination of wired and wireless hardware) and software components (e.g., drivers, protocol stacks) to enable device 800 to communicate with external devices. The external device could be separate devices, such as other computing devices, wireless access points or base stations, as well as peripherals such as headsets, printers, or other devices. In one embodiment, system 800 exchanges data with an external device for storage in memory or for display on a display device. The exchanged data can include data to be stored in memory, or data already stored in memory, to read, write, or edit data.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading, uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, memory subsystem 860 of system 800 includes clock domain crossing 890, which represents logic to perform a clock domain crossing in accordance with any embodiment described herein where a valid indication is dynamically transferred early to coincide with an asserted TSV signal in the faster clock domain. The transfer early in the faster clock domain can reduce a delay in reading out the data associated with the valid indication in the slower clock domain, in accordance with what is described herein. In one embodiment, clock domain crossing logic 890 represents one or more circuits between a processor core circuit of processor 810 and a circuit of memory controller 864. For example, clock domain crossing logic 890 can represent a circuit on a processor die that includes processor cores and integrated memory controller 864. In one embodiment, such an embodiment can further include one or more memory dies of memory 862 integrated with a processor die in an SOC package.

In one aspect, a system to transfer data from a faster clock domain to a slower clock domain includes: a data buffer between a first device having a first clock domain, and a second device having a second clock domain with a slower clock than the first clock domain, wherein the data buffer is to buffer data from the first device to the second device; a valid indicator buffer between the first and second devices, the valid indicator buffer to buffer valid indicators to indicate what clock edges of the second clock domain the second device should read data from the data buffer; and control logic to control buffering of the valid indicators in the valid indicator buffer, the control logic to generate a regular sequence of time slot valid (TSV) indications in the first clock domain to indicate clock edges of the first clock domain corresponding to a minimum timing requirement for the second device to receive data from the first device, and to determine that a data signal in the first clock domain is to coincide with a TSV indication and that a valid indicator associated with the data signal is to not coincide with a TSV indication, and responsive to the determination, to buffer the valid indicator associated with the data signal in the valid indicator buffer on an earlier TSV indication.

In one embodiment, the valid indicator buffer comprises a first-in, first-out (FIFO) buffer. In one embodiment, a given valid indicator is to arrive at least N clock cycles prior to an associated data signal, where N is 1 or more clock cycles. In one embodiment, the control logic to buffer the valid indicator on an earlier TSV indication comprises to find in a pipeline of TSV indications an oldest TSV indication that is at least N clock cycles prior to a clock cycle on which data is to be dequeued from the data buffer. In one embodiment, the control logic to send the valid indicator on an earlier TSV indication comprises to send the valid indicator one clock earlier. In one embodiment, the control logic comprises a TSV generator to generate TSV indications as a periodic sequence based on a ratio of the slower clock of the second clock domain to a faster clock of the first clock domain. In one embodiment, the first device and the second device are coupled together in a system on a chip. In one embodiment, the first device comprises a processor, and the second device comprises a memory device. In one embodiment, further comprising one or more of: a memory controller coupled to the processor and the memory device; a display communicatively coupled to the processor; a battery to power the system; or a network interface communicatively coupled to the processor.

In one aspect, a system on a chip (SOC) includes: a substrate; a first device on the substrate, including I/O (input/output) circuitry to be operated in accordance with a first clock; and a second device on the substrate, including I/O circuitry to be operated in accordance with a second clock slower than the first clock, the I/O circuitry of the second device to couple to the I/O circuitry of the first device, the wherein the I/O circuitry of the second device including: a data buffer to buffer data from the first device; time slot valid (TSV) logic to control buffering of the data into and out of the data buffer, the TSV logic to generate TSV indications to indicate clock edges of the first clock to buffer data to be dequeued with the second clock to meet a minimum timing requirement for the second device, and the TSV logic to determine that a data signal to be buffered is to coincide with a TSV indication and that a valid indicator associated with the data signal is to not coincide with a TSV indication, and responsive to the determination, to buffer the valid indicator associated with the data signal on an earlier TSV indication.

In one embodiment, the TSV logic comprises a valid indicator FIFO (first in, first out) buffer. In one embodiment, a given valid indicator is to arrive at least N clock cycles prior to an associated data signal, where N is 1 or more clock cycles. In one embodiment, the TSV logic comprises a TSV pipeline to buffer a sequence of TSV indications. In one embodiment, the TSV logic to buffer the valid indicator on an earlier TSV indication comprises to find an oldest TSV indication of the TSV pipeline that is at least N clock cycles prior to a clock cycle on which data is to be dequeued from the data buffer. In one embodiment, the TSV logic comprises a TSV generator to generate TSV indications as a periodic sequence based on a ratio of the slower clock of the second clock domain to a faster clock of the first clock domain. In one embodiment, the first device comprises a processor die, and the second device comprises a memory die. In one embodiment, further comprising one or more of: a memory controller integrated on the processor die; a display communicatively coupled to the processor die; a battery to power the SOC; or a network interface communicatively coupled to the processor die.

In one aspect, a method for input/output (I/O) with a memory device includes: determining in a clock domain crossing circuit for a faster clock and a slower clock, that an input data signal will coincide with a time slot valid (TSV) signal being asserted; determining that N clock cycles prior to the data signal the TSV signal will be deasserted; responsive to determining the TSV signal will be deasserted, detecting when the TSV signal will be asserted more than N clock cycles of the faster clock prior to the data signal; and queueing an early warning signal to indicate the data signal with the detected TSV signal to be asserted more than N clock cycles prior to the data signal.

In one embodiment, detecting when the TSV signal will be asserted more than N clock cycles prior to the data signal comprises identifying TSV signals of a TSV pipeline where the TSV signal is to be asserted. In one embodiment, queueing the early warning signal comprises queueing a data valid signal in a valid first in, first out (FIFO) buffer to trigger dequeuing of the data signal from a data FIFO buffer at a first clock cycle of the slower clock after the data signal is queued in the data FIFO buffer. In one embodiment, determining that the input data signal will coincide with a TSV signal being asserted comprises generating TSV indications as a periodic sequence based on a ratio of the slower clock of the second clock domain to a faster clock of the first clock domain.

In one aspect, a clock domain crossing circuit includes: a data buffer to buffer data between a first clock domain and a second clock domain slower than the first domain; a valid indicator buffer to buffer valid indicators to indicate what clock edges of the second clock domain having data transferred from the first clock domain; and control logic to control buffering of the valid indicators in the valid indicator buffer in accordance with time slot valid (TSV) indications in the first clock domain to indicate clock edges of the first clock domain in which data transferred from the first clock domain will meet a minimum timing requirement for data reception in the second clock domain, the control logic to determine that a data signal in the first clock domain is to coincide with a TSV indication and that a valid indicator associated with the data signal is to not coincide with a TSV indication, and responsive to the determination, to buffer the valid indicator associated with the data signal in the valid indicator buffer on an earlier TSV indication.

In one embodiment, the valid indicator buffer comprises a first-in, first-out (FIFO) buffer. In one embodiment, a given valid indicator is to arrive at least N clock cycles prior to an associated data signal, where N is 1 or more clock cycles. In one embodiment, the control logic to buffer the valid indicator on an earlier TSV indication comprises to find in a pipeline of TSV indications an oldest TSV indication that is at least N clock cycles prior to a clock cycle on which data is to be dequeued from the data buffer. In one embodiment, the control logic to send the valid indicator on an earlier TSV indication comprises to send the valid indicator one clock earlier. In one embodiment, the control logic comprises a TSV generator to generate TSV indications as a periodic sequence based on a ratio of the slower clock of the second clock domain to a faster clock of the first clock domain. In one embodiment, the first clock domain comprises a clock domain of a first device and the second clock domain comprises a clock domain of a second device, wherein the first and second devices are coupled together in a system on a chip. In one embodiment, the first device comprises a processor, and the second device comprises a memory device.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware, software, or a combination. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, data, or a combination. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters or sending signals, or both, to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A system to transfer data from a faster clock domain to a slower clock domain, comprising:
 a data buffer between a first device having a first clock domain, and a second device having a second clock domain with a slower clock than the first clock domain, wherein the data buffer is to buffer data from the first device to the second device;
 a valid indicator buffer between the first and second devices, the valid indicator buffer to buffer valid indicators to indicate what clock edges of the second clock domain the second device should read data from the data buffer; and
 control logic to control buffering of the valid indicators in the valid indicator buffer, the control logic to generate a regular sequence of time slot valid (TSV) indications in the first clock domain to indicate clock edges of the first clock domain corresponding to a minimum timing requirement for the second device to receive data from the first device, and to determine that a data signal in the first clock domain is to coincide with a TSV indication and that a valid indicator associated with the data signal is to not coincide with a TSV indication, and responsive to the determination, to buffer the valid indicator associated with the data signal in the valid indicator buffer on an earlier TSV indication.

2. The system of claim 1, wherein the valid indicator buffer comprises a first-in, first-out (FIFO) buffer.

3. The system of claim 1, wherein a given valid indicator is to arrive at least N clock cycles prior to an associated data signal, where N is 1 or more clock cycles.

4. The system of claim 3, wherein the control logic to buffer the valid indicator on an earlier TSV indication comprises to find in a pipeline of TSV indications an oldest TSV indication that is at least N clock cycles prior to a clock cycle on which data is to be dequeued from the data buffer.

5. The system of claim 3, wherein the control logic to send the valid indicator on an earlier TSV indication comprises to send the valid indicator one clock earlier.

6. The system of claim 1, wherein the control logic comprises a TSV generator to generate TSV indications as a periodic sequence based on a ratio of the slower clock of the second clock domain to a faster clock of the first clock domain.

7. The system of claim 1, wherein the first device and the second device are coupled together in a system on a chip.

8. The system of claim 1, wherein the first device comprises a processor, and the second device comprises a memory device.

9. The system of claim 8, further comprising one or more of:
 a memory controller coupled to the processor and the memory device;
 a display communicatively coupled to the processor;
 a battery to power the system; or
 a network interface communicatively coupled to the processor.

10. A system on a chip (SOC), comprising:
 a substrate;
 a first device on the substrate, including I/O (input/output) circuitry to be operated in accordance with a first clock; and
 a second device on the substrate, including I/O circuitry to be operated in accordance with a second clock slower than the first clock, the I/O circuitry of the second device to couple to the I/O circuitry of the first device, wherein the I/O circuitry of the second device including:
 a data buffer to buffer data from the first device; and
 time slot valid (TSV) logic to control buffering of the data into and out of the data buffer, the TSV logic to generate TSV indications to indicate clock edges of the first clock to buffer data to be dequeued with the second clock to meet a minimum timing requirement for the second device, and the TSV logic to determine that a data signal to be buffered is to coincide with a TSV indication and that a valid indicator associated with the data signal is to not coincide with a TSV indication, and responsive to the determination, to buffer the valid indicator associated with the data signal on an earlier TSV indication.

11. The SOC of claim 10, wherein the TSV logic comprises a valid indicator FIFO (first in, first out) buffer.

12. The SOC of claim 10, wherein a given valid indicator is to arrive at least N clock cycles prior to an associated data signal, where N is 1 or more clock cycles.

13. The SOC of claim 12, wherein the TSV logic comprises a TSV pipeline to buffer a sequence of TSV indications.

14. The SOC of claim 13, wherein the TSV logic to buffer the valid indicator on an earlier TSV indication comprises to find an oldest TSV indication of the TSV pipeline that is at least N clock cycles prior to a clock cycle on which data is to be dequeued from the data buffer.

15. The SOC of claim 10, wherein the TSV logic comprises a TSV generator to generate TSV indications as a periodic sequence based on a ratio of the slower second clock to the faster first clock.

16. The SOC of claim 10, wherein the first device comprises a processor die, and the second device comprises a memory die.

17. The SOC of claim 16, further comprising one or more of:
   a memory controller integrated on the processor die;
   a display communicatively coupled to the processor die;
   a battery to power the SOC; or
   a network interface communicatively coupled to the processor die.

18. A method for input/output (I/O) with a memory device, comprising:
   determining in a clock domain crossing circuit for a faster clock and a slower clock, that an input data signal will coincide with a time slot valid (TSV) signal being asserted;
   determining that N clock cycles prior to the input data signal the TSV signal will be deasserted;
   responsive to determining the TSV signal will be deasserted, detecting when the TSV signal will be asserted more than N clock cycles of the faster clock prior to the input data signal; and
   queueing an early warning signal to indicate the input data signal with the detected TSV signal to be asserted more than N clock cycles prior to the input data signal.

19. The method of claim 18, wherein detecting when the TSV signal will be asserted more than N clock cycles prior to the input data signal comprises identifying TSV signals of a TSV pipeline where the TSV signal is to be asserted.

20. The method of claim 18, wherein queueing the early warning signal comprises queueing a data valid signal in a valid first in, first out (FIFO) buffer to trigger dequeuing of the input data signal from a data FIFO buffer at a first clock cycle of the slower clock after the input data signal is queued in the data FIFO buffer.

* * * * *